United States Patent
Snelick et al.

(10) Patent No.: US 8,876,393 B2
(45) Date of Patent: Nov. 4, 2014

(54) BEARING ENCLOSURE WITH INTEGRATED WEAR DETECTION

(75) Inventors: John Snelick, Canal Fulton, OH (US); Ray Bomford, Chalfont St Peter (GB)

(73) Assignee: Safran Power UK Ltd., Pitstone Green (GB)

( * ) Notice: Subject to any disclaimer, the term of this patent is extended or adjusted under 35 U.S.C. 154(b) by 411 days.

(21) Appl. No.: 12/956,308

(22) Filed: Nov. 30, 2010

(65) Prior Publication Data
US 2012/0134612 A1   May 31, 2012

(51) Int. Cl.
| | | |
|---|---|---|
| *F16C 19/52* | (2006.01) | |
| *F16C 33/78* | (2006.01) | |
| *G01B 7/14* | (2006.01) | |
| *F16C 19/06* | (2006.01) | |

(52) U.S. Cl.
CPC .............. *F16C 19/52* (2013.01); *F16C 19/06* (2013.01); *F16C 33/7846* (2013.01); *G01B 7/144* (2013.01)
USPC ........................................... 384/448

(58) Field of Classification Search
USPC .................. 384/445, 448, 490; 73/7
See application file for complete search history.

(56) References Cited

U.S. PATENT DOCUMENTS

| | | | | |
|---|---|---|---|---|
| 3,574,424 A | * | 4/1971 | Hagemeister | 384/517 |
| 3,999,376 A | * | 12/1976 | Jeryan et al. | 60/799 |
| 5,594,334 A | * | 1/1997 | Sonnerat et al. | 324/173 |
| 6,702,470 B2 | * | 3/2004 | Beauprez | 384/448 |
| 6,948,856 B2 | * | 9/2005 | Takizawa et al. | 384/448 |
| 7,604,413 B2 | * | 10/2009 | Koike et al. | 384/448 |
| 2005/0238269 A1 | * | 10/2005 | Endoh et al. | 384/294 |
| 2007/0277612 A1 | * | 12/2007 | Ehrfeld et al. | 384/448 |
| 2008/0037920 A1 | * | 2/2008 | Lou | 384/448 |
| 2009/0208159 A1 | * | 8/2009 | Heim et al. | 384/448 |

FOREIGN PATENT DOCUMENTS

JP      2005 344842 A      12/2005

OTHER PUBLICATIONS

International Search Report dated Feb. 23, 2012.

* cited by examiner

*Primary Examiner* — Thomas R. Hannon
(74) *Attorney, Agent, or Firm* — Oblon, Spivak, McClelland, Maier & Neustadt, L.L.P.

(57) ABSTRACT

An electro-mechanical fuse integrated into the enclosure of a bearing assembly of a generator or like component. Under normal operation, the electro-mechanical fuse provides continuity through a bearing sensing circuit. However, ball cage damage causes the fuse to open and, in turn, the bearing sensing circuit indicates bearing wear. Thus, damage to other generator components is greatly reduced because the generator is removed for maintenance in a timely manner.

15 Claims, 3 Drawing Sheets

BEARING ENCLOSURE WITH INTEGRATED WEAR DETECTION

BACKGROUND OF THE DISCLOSURE

1. Field of the Disclosure

The subject disclosure relates to bearing enclosures with wear detection, and more particularly to an improved wear detection mechanism based on sensing a damaged ball cage.

2. Background of the Related Art

In aircraft and other applications, generator designs commonly use life lubricated deep groove ball bearings to support rotor loads. The bearings are also replaced at established intervals to avoid costly repairs and/or malfunctions. A typical DC air cooled generator often has auxiliary bearing systems to prevent potentially catastrophic failure. The auxiliary bearing supports the rotor load after the main bearing has failed.

Systems are designed such that a bearing failure sensor alerts the flight crew that wear has been detected in the main bearing. Under current guidelines, the airline may continue revenue flight operations for a limited number of hours from the alert, after which the generator must be removed for bearing replacement. One advantage of the auxiliary bearing system for the aircraft operator is to avoid dispatch delays caused by a generator bearing failure and the immediate need for aircraft maintenance.

There are problems associated with prior art bearing wear detection systems. Prior art systems rely on recognizing increase in radial play due to bearing wear. For preloaded bearings, determining the radial play is difficult and inexact, which often results in delay in bearing wear detection. Further, the prior art technology was acceptable for steel ball bearing designs since the steel balls progressively wear creating the radial play in advance of catastrophic ball cage damage. However, ceramic ball bearing designs wear differently, which prevents these methods from being optimal.

It is desirable to use ceramic balls in the main bearings because ceramic balls increase the life of the bearing. Although the ceramic balls are very robust, the other components may stop to function properly causing failure. A common failure mode of a ceramic deep groove ball bearing is that the grease degrades which causes the ball cage to fail from dynamic instability. Eventually parts of the ball cage are expelled from the bearing. It is noteworthy that because the bearing is preloaded, the ball cage failure does not result in a significant increase in radial play. Thus, cage damage may go undetected for some time. Frequently, as radial play increases, the gathered balls bind the inner ring and outer ring which normally causes the outer ring to rotate in the bearing liner bore. Continuous operation under these conditions causes damage to generator components and also imparts heat and high loading on the auxiliary bearing. As the bearing reaches the end of usefulness, radial play increases only after the cage has been consumed and considerable wear occurs on the inner and outer rings of the bearing. Examples of bearing wear detection systems are shown in U.S. Pat. No. 6,100,809 issued on Aug. 8, 2000 to Novoselsky et al. and U.S. Pat. No. 6,119,504 issued on Sep. 19, 2000 to Claus, each of which is incorporated herein by reference in its entirety.

SUMMARY OF THE INVENTION

There is a need, therefore, for an improved bearing enclosure which avoids delay in detection of ceramic ball main bearing failure. As a result, detection of an impending bearing failure is improved. Since deformation of the ball cage and/or portions of the ball cage breaking loose are an indication of bearing enclosure damage, the subject technology senses ball cage damage early to accomplish the early wear detection.

In some applications, the subject technology also alleviates and may even eliminate the need for auxiliary bearings since the ceramic ball bearing may function for a significant period of time after grease depletion and the initiation of cage damage. If this period of reliable operation (with cage damage) is greater than the period normally expected by aircraft operators (approximately 20 hours) then the auxiliary bearing may not be necessary. In one embodiment, the sensor for determining cage deformation is integrated into the bearing. Thus, the overall bill of materials for the generator is reduced.

Another embodiment of the subject technology is directed to an electro-mechanical fuse integrated into the enclosure or seal of a bearing assembly. The enclosure is an integrated part of the bearing assembly and is installed after the grease operation. Under normal operation, the electro-mechanical fuse provides continuity through a bearing sensing circuit. Ball cage damage causes the fuse to open and, in turn, the bearing sensing circuit indicates bearing wear. Thus, damage to other generator components is greatly reduced because the generator is removed for maintenance in a timely manner.

Still another embodiment is directed to a bearing assembly including a bearing enclosure with bearings mounted for movement in a race formed by the bearing enclosure. A ball cage is within the bearing enclosure and surrounds the bearings. A fuse couples to the bearing enclosure and a bearing sensing circuit couples to the fuse. Under normal operation, the electro-mechanical fuse provides continuity to the bearing sensing circuit. Under operation after bearing wear, the fuse breaks such that the bearing sensing circuit generates a signal indicating bearing wear. The fuse may be an annular disc and a thin layer of conductive material fixed to the disc to provide electrical continuity within the bearing sensing circuit. The annular disc is ceramic and the thin layer is silver paste. The annular disc is preferably bonded to an inside surface of the bearing enclosure at a radial location approximately equal to a radial location of the ball cage.

Yet another embodiment is directed to a bearing wear detection assembly including an electro-mechanical fuse including a disc with a conductive portion, and a bearing sensing circuit connected to the electro-mechanical fuse such that when the fuse opens, the bearing sensing circuit generates a signal indicating bearing wear. Preferably, the disc is ceramic and the conductive portion is a thin layer of silver paste. The thin layer may be arcuate so that a gap forms between two ends thereof. Leads connect to each end, respectively, for completing an electrical connection to the bearing sensing circuit. The disc may be bonded to an inside surface of a bearing assembly enclosure at a radial location approximately equal to a radial location of a ball cage surrounding bearings.

It should be appreciated that the present technology can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
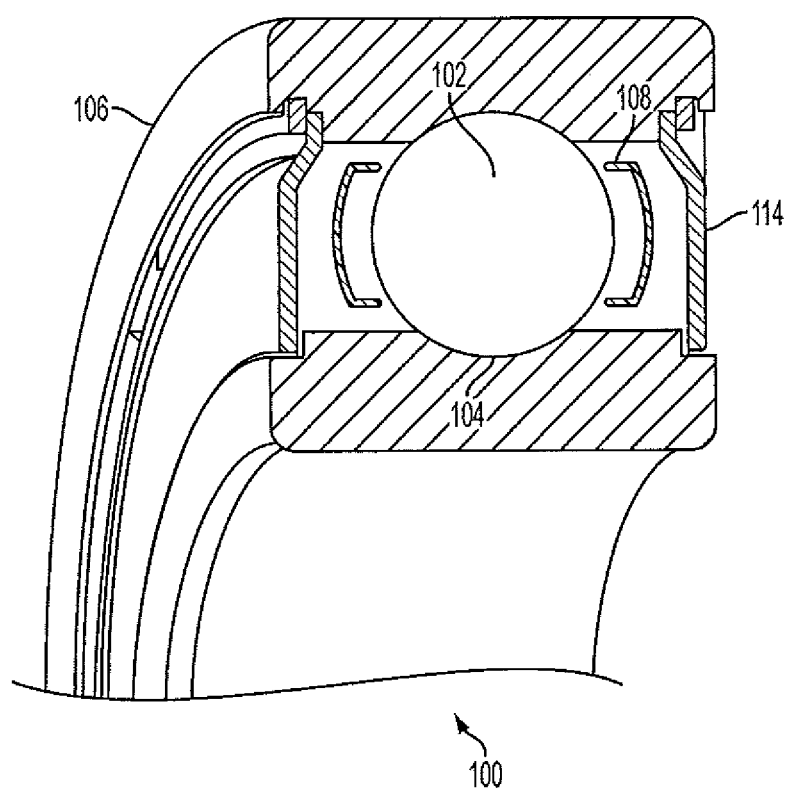
FIG. 1 is a cross-sectional perspective view of a bearing assembly in accordance with the subject technology.

The present disclosure overcomes many of the prior art problems associated with bearing wear detection systems. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

Now referring to FIG. 1, a cross-sectional perspective view of a bearing assembly 100 in accordance with the subject technology is shown. Heavy equipment such as bulldozers and a variety of other applications now known and later developed may advantageously utilize the subject technology for detecting wear of like bearing assemblies. The bearing assembly 100 is well-suited for use in aircraft electrical generators.

The bearing assembly 100 includes bearings 102 mounted for movement in a track or race 104 formed by an enclosure 106. The enclosure 106 also houses a ball cage 108 that surrounds the bearings. The area surrounding the bearings 102 usually includes a lubricant such as grease. The grease may be maintained in place by seals (not shown). The bearings 102 are shown as balls but may be cylinders, rollers and the like.

Figure 2:
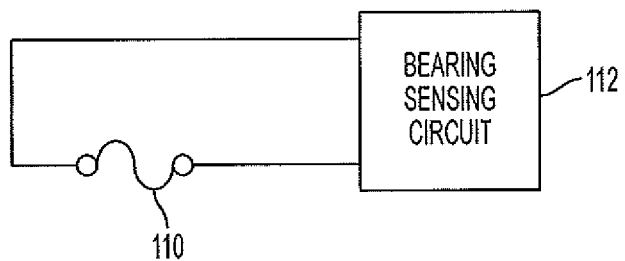
FIG. 2 is a schematic representation of a bearing sensing circuit with a fuse in accordance with the subject technology.

Referring now to FIG. 2, a schematic representation of an electro-mechanical fuse 110 coupled to a bearing sensing circuit 112 in accordance with the subject technology is shown. The electro-mechanical fuse 110 is integrated into the enclosure 106 of the bearing assembly 100 as described below with respect to FIG. 3. Under normal operation, the electro-mechanical fuse 110 provides continuity to the bearing sensing circuit 112. In other words, when the electro-mechanical fuse 110 is intact and electrically coupled to the bearing sensing circuit 112, the bearing sensing circuit 112 outputs a signal indicating the wear condition of the bearing assembly 100 is acceptable. The signal may ultimately reach the aircraft pilot as an affirmative indication of acceptable parameters or simply the lack of an indication of operational issues and the like.

Referring again to FIG. 1, as the bearing assembly 100 wears, pitting and fragmentation of the components occurs. The race 104 and ball cage 108 are particularly susceptible to damage because the bearings 102 are usually a relatively harder material. For example, deformation of the ball cage 108 or even loose debris resulting from portions of the ball cage 108 breaking loose can create a damaging force on the electro-mechanical fuse 110. The damage causes the electro-mechanical fuse 110 to be broken, e.g., the fuse 110 opens. As a result, electrical continuity with the bearing sensing circuit 112 is lost and the bearing sensing circuit 112 generates a signal indicating bearing wear. Thus, damage to other generator components is greatly reduced because the generator is removed for maintenance in a timely manner. The electro-mechanical fuse 110 may be located in a plurality of different locations such as for example on one or more seals instead of or in addition to being located within the enclosure 102.

Figure 3:
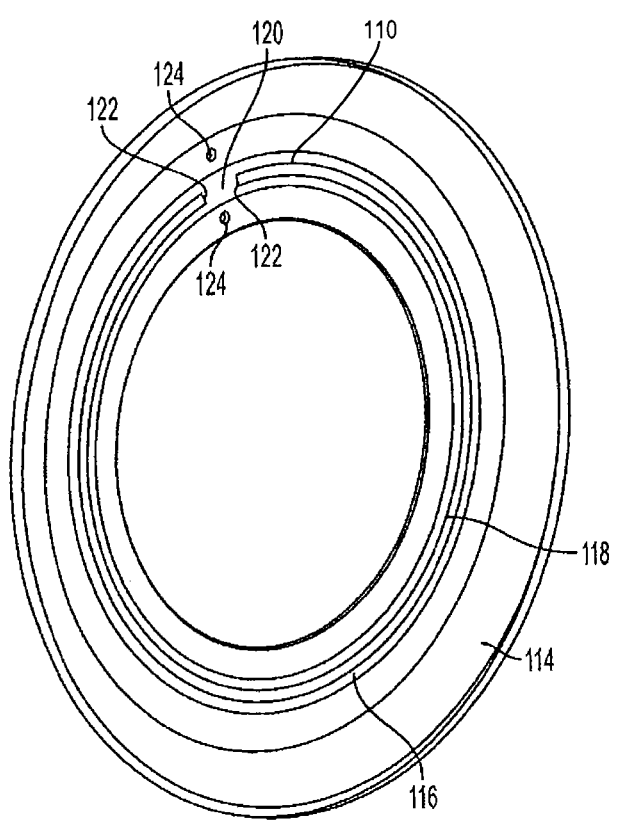
FIG. 3 is a perspective view of a bearing enclosure component having an electro-mechanical fuse in accordance with the subject technology.

Referring now to FIG. 3, a perspective view of a bearing enclosure component 114 having an electro-mechanical fuse 110 in accordance with the subject technology is shown. The bearing enclosure component 114 may be an integral part of the enclosure 106 of the bearing assembly 100 or formed as a subcomponent of the bearing enclosure 106 as shown. As shown, the bearing enclosure component 114 is a subcomponent that forms a wall of the bearing enclosure 106. The bearing enclosure component 114 has a thin annular disc 116 bonded thereto. In one embodiment, the annular disc 116 is made from ceramic such that the disc 116 is relatively fragile. The ceramic disc 116 is bonded to the bearing enclosure component such that the ceramic disc 116 is at an inside surface of the enclosure 106 at the same radial location as the ball cage 108.

A thin layer 118 of conductive material is fixed to the disc 116 to provide electrical continuity within the bearing sensing circuit 112. Preferably, the thin layer 118 is silver paste fired onto the disc 116 before bonding to the enclosure component 114. The thin layer 118 is arcuate so that a gap 120 forms between two ends 122 thereof. Two thin leads (not shown) pass through holes 124 in the bearing enclosure component 114 to electrically attach to the ends 122, respectively. The leads are soldered to the thin layer 118 on one end and routed outside the enclosure 106 to connect to the bearing sensing circuit 112 on the other end.

As noted above, during normal operation, the thin layer 118 completes the bearing sensing circuit 112. In this condition, the bearing sensing circuit 112 generates a signal or lack of a signal, as the case may be, indicating normal conditions. However, as wear occurs and the bearing cage 108 and/or other components fail, debris breaks the fragile disc 116. As a result, the electrical continuity of the thin layer 118 is broken. The loss of electrical continuity causes a bearing wear indication signal to be generated by the bearing sensing circuit 112.

The subject technology is easily applied to bearings that are not floating. On bearings that float, some restriction of bearing rotation is preferable so that the thin layer 118 does not open under normal precession of the bearings 102. The anti-rotation may be an anti-rotation pin with low shear strength so that the anti-rotation aspects could be easily overridden by abnormally high rotational forces such as those caused by increased rotational torque in the main bearing.

In another embodiment, an electronic circuit or portion of a circuit (now shown) is provided instead of the disc 116 and layer 118. The electronic circuit would be micro-electronics mounted on the component 114 or otherwise that creates a continuous circuit similarly susceptible to disruption by bearing wear. Alternatively or additionally, the electronic circuit could provide one or more environmental parameters such as a vibration frequency and/or amplitude of the ball cage 108. Such parameters would also be used to predict and indicate bearing wear.

As would be appreciated by those of ordinary skill in the pertinent art, the subject technology is applicable to use in any type of bearing assembly with significant advantages for aircraft electrical generator applications. The functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements, separated in different hardware or distributed in various ways in a particular implementation. Further, relative size and location are merely somewhat schematic and it is understood that not only the same but many other embodiments could have varying depictions.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A bearing assembly comprising:
a bearing enclosure;
bearings mounted for movement in a race formed by the bearing enclosure;
a ball cage within the bearing enclosure and surrounding the bearings;
an electro-mechanical fuse coupled to a bearing enclosure component of the bearing enclosure, wherein the electro-mechanical fuse includes an annular disc bonded to an inside surface of the bearing enclosure at a radial location approximately equal to a radial location of the ball cage and a layer of conductive material fixed to the annular disc to provide electrical continuity within the bearing sensing circuit; and
a bearing sensing circuit coupled to the fuse,
wherein, in a first condition under normal operation, the layer of conductive material of the electro-mechanical fuse provides electrical continuity to the bearing sensing circuit, and, in a second condition under operation after bearing wear, the layer of conductive material of the electro-mechanical fuse is disrupted by damage to the annular disc such that the bearing sensing circuit generates a signal indicating bearing wear.

2. A bearing assembly as recited in claim 1, wherein the annular disc is ceramic and the layer is silver paste.

3. A bearing assembly as recited in claim 1, wherein the layer is arcuate so that a gap forms between two ends thereof and further comprising leads connected to each end, respectively, for completing an electrical connection to the bearing sensing circuit.

4. A bearing assembly as recited in claim 1, wherein the bearings are not floating.

5. A bearing assembly as recited in claim 1, wherein the bearings are floating.

6. A bearing assembly as recited in claim 1, wherein the bearing enclosure component forms a wall of the bearing enclosure.

7. A bearing wear detection assembly comprising:
an electro-mechanical fuse including a disc with a conductive portion; and
a bearing sensing circuit connected to the electro-mechanical fuse such that when the fuse opens, the bearing sensing circuit generates a signal indicating bearing wear,
wherein the disc is bonded to an inside surface of a bearing assembly enclosure adjacent to a ball cage surrounding bearings and at a radial location approximately equal to a radial location of the ball cage such that upon deformation of the ball cage, the ball cage breaks the disc of the electro-mechanical fuse so as to open the fuse and generate the signal, and
wherein the bearing sensing circuit is connected to the conductive portion of the disc of the fuse.

8. A bearing wear detection assembly as recited in claim 7, wherein the disc is ceramic and the conductive portion is a layer of silver paste.

9. A bearing wear detection assembly as recited in claim 8, wherein the layer is arcuate so that a gap forms between two ends thereof and further comprising leads connected to each end, respectively, for completing an electrical connection to the bearing sensing circuit.

10. A bearing wear detection assembly comprising:
a bearing enclosure;
a ball cage mounted with the bearing enclosure and surrounding bearings; and
a fuse including a disc with a conductive portion, the fuse mounted to the bearing enclosure at a radial location approximately equal to a radial location of the ball cage such that the ball cage generates debris as the bearings wear and the debris breaks the disc to disrupt electrical continuity in the conductive portion and generate a signal indicating bearing wear, the disc being mounted to an inside surface of the bearing enclosure.

11. A bearing wear detection assembly as recited in claim 10, further comprising a bearing sensing circuit connected to the conductive portion such that when the electrical continuity is disrupted, the bearing sensing circuit generates a signal indicating bearing wear.

12. A bearing wear detection assembly as recited in claim 10, wherein the disc is ceramic, the conductive portion is a thin layer of silver paste, and the bearings are ceramic balls.

13. A bearing wear detection assembly as recited in claim 12, wherein the layer is arcuate so that a gap forms between two ends thereof and further comprising leads connected to each end, respectively, for completing an electrical connection to a bearing sensing circuit.

14. A bearing assembly comprising:
a bearing enclosure;
bearings mounted for movement in a race formed by the bearing enclosure;
a ball cage within the bearing enclosure and surrounding the bearings; and
a circuit portion coupled to the bearing enclosure adjacent the ball cage,
wherein, in a first condition under normal operation, the circuit portion provides a first signal indicating normal operation, and, in a second condition under operation after bearing wear, the bearing wear damages the ball cage which directly impacts the circuit portion to generate a second signal indicating bearing wear based upon a change in the ball cage, and
wherein the circuit portion includes a layer of conductive material presenting a gap.

15. A bearing assembly as in claim 14, wherein a difference between the first and second signals is a change in frequency.

* * * * *